June 10, 1924.

B. C. BATCHELLER

TESTING MACHINE

Filed May 21, 1920

Inventor.
Binney C. Batcheller,
By his attorney,
J. H. McCrady

Patented June 10, 1924.

1,496,838

UNITED STATES PATENT OFFICE.

BIRNEY CLARK BATCHELLER, OF BROOKLYN, NEW YORK, ASSIGNOR TO BEMIS BRO. BAG CO., OF BOSTON, MASSACHUSETTS, A CORPORATION OF MISSOURI.

TESTING MACHINE.

Application filed May 21, 1920. Serial No. 383,201.

*To all whom it may concern:*

Be it known that I, BIRNEY CLARK BATCHELLER, a citizen of the United States, residing at Brooklyn, in the county of Kings and State of New York, have invented certain Improvements in Testing Machines, of which the following description, in connection with the accompanying drawings, is a specification, like reference characters on the drawings indicating like parts in the several figures.

This invention relates to a machine for testing the tensile strength of sheet materials, especially paper, cloth, and the like. The invention has among its objects to devise a machine or instrument of this type in which the errors in measurement shall be reduced to a minimum, in which the testing stress can be applied in a definite direction to the grain or fibre of the goods or the material, which shall be simple in construction, convenient to operate, inexpensive to manufacture, and which generally shall be an improvement on machines of this kind heretofore proposed.

The nature of the invention will be readily understood from the following description when read in connection with the accompanying drawings, and the novel features will be particularly pointed out in the appended claims.

Referring now to the drawings.

Figure 1:
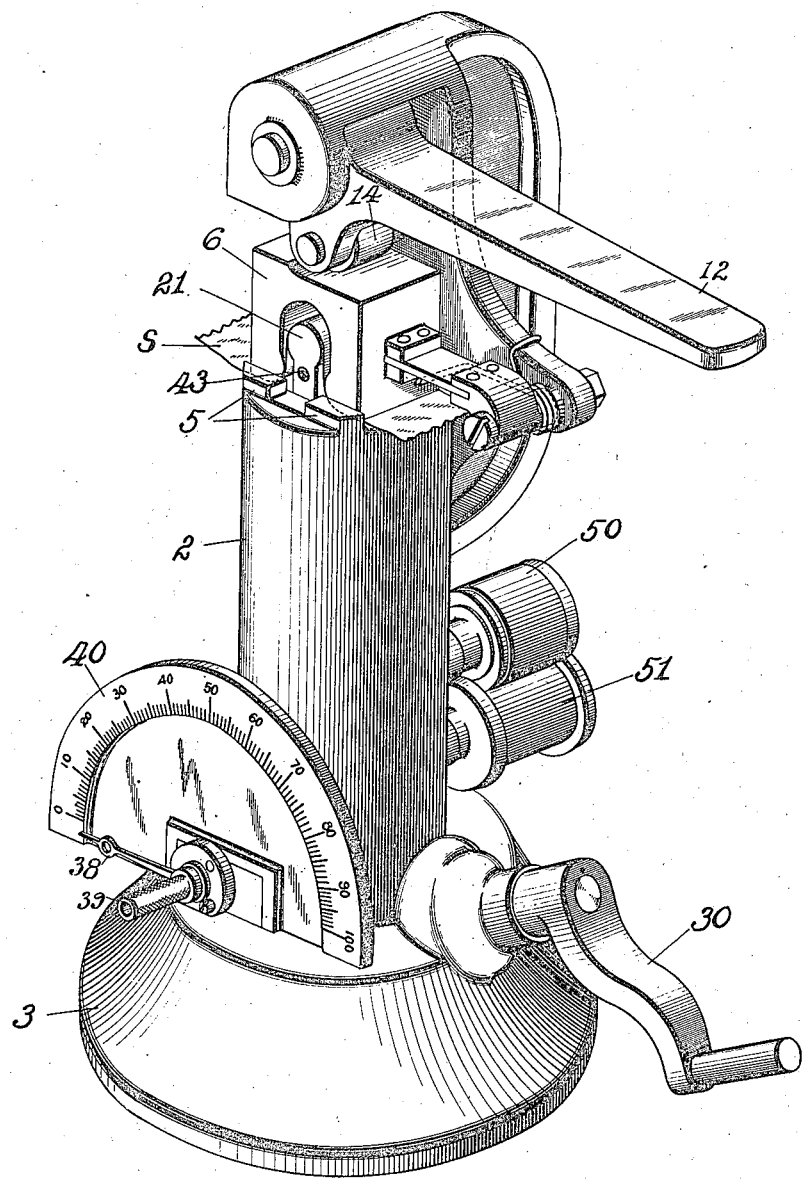
Figure 1 is an angular view of a machine constructed in accordance with this invention and designed especially for testing paper.

The construction shown comprises a hollow upright frame 2 having a suitable base 3 adapted to stand on a table or other support. The upper part of this frame is provided with flat face portions 4—4, Fig. 2, to receive the specimen S to be tested. It is contemplated that the test specimen shall be in the form of a narrow strip of paper of any suitable length and for convenience in locating the position of this strip on the table or surface 4 this table is provided with lugs 5 spaced apart by a suitable distance to receive the specimen between them.

The specimen is clamped on the surfaces 4—4 by an inverted U-shaped clamping head 6, the opposite sides of this head having faces to press the strip S firmly against the surfaces 4—4. A short spring arm 7 riveted to the head 6 and also to a member 8 that is mounted on a pivot bolt 9 supported in a lug projecting from the machine frame, supports the head for swinging movement about the axis of the bolt 9. A coiled spring 10 acts on the arm 7 to hold the head 6 normally in a raised position, as indicated in dotted lines in Fig. 2.

For the purpose of forcing the head 6 downwardly into its clamping position, a hand lever 12 is fulcrumed on a pivot pin 13 supported in the machine frame and carries a roll 14 designed to engage the upper surface 15 of the head 6. It will be seen from an inspection of Fig. 2 that when this lever is moved into the position there shown in full lines, the head 6 will be forced downwardly under a heavy pressure and thus will securely clamp the specimen against the stationary surfaces 4. It will also be observed that the line of thrust of the block against its pressure applying mechanism at this time is substantially in the line connecting the axes 13 of the pivot 14. Consequently, when the parts are in this position they are automatically locked against releasing movement.

Figure 3:
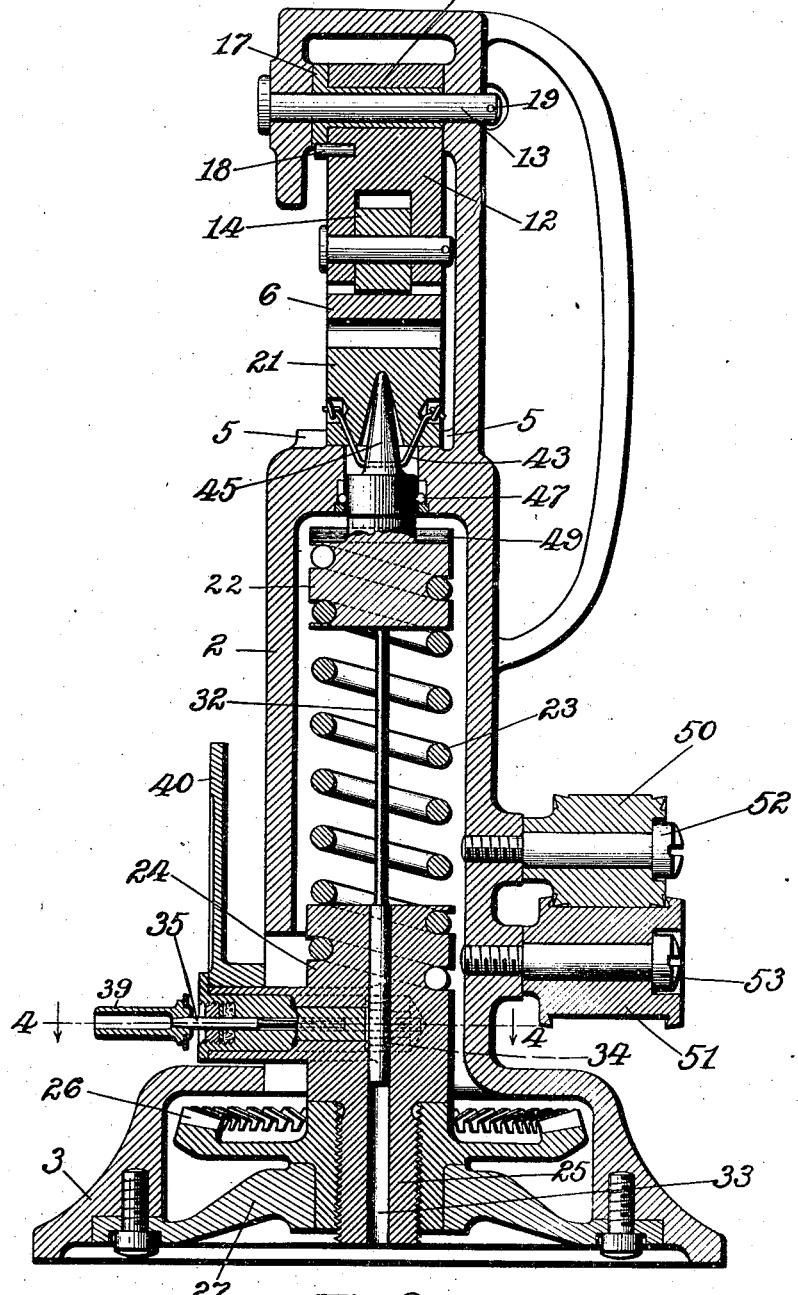
Fig. 3 is a view similar to Fig. 2 but taken on a plane at right angles thereto.

For the purpose of compensating for substantial variations in the thickness of the material being tested, the pivot pin 13 is mounted in an eccentric bushing 16, Fig. 3, and this bushing is provided with a head 17 lying between an overhanging part of the frame and a portion of the lever 12. This head is provided with a plurality of notches each designed to receive a pin 18. The pivot pin 13 is held in position by a cotter pin 19 so that whenever it is desired to adjust the distance between this pivot and the roll 14 the cotter pin is removed thus permitting the withdrawal of the pivot 13, and the lever 12 with the bushing 16 is then removed from the machine and the bushing is adjusted into the desired relationship to the lever. The parts are then assembled again.

The upper part of the frame is liable to spring slightly when a specimen is clamped in position and the roll 14 therefore is made somewhat larger in diameter in the middle than at its ends so that its central portion will always bear firmly on the face 15 even if the frame does spring some.

This clamping mechanism has the advantage of being very quickly operated and convenient to adjust, and the automatic movement of the clamping head 6 into its upper or inoperative position when the pressure thereon is released is of great convenience in placing a new specimen in position to be tested.

It will now be seen that this mechanism clamps the specimen at two points spaced apart. For the purpose of tensioning the specimen so clamped, a plunger head 21 is provided to engage the test strip S between the points at which it is clamped. This plunger head is mounted on the upper end of a plunger 22 which is supported on the upper end of a helical spring 23 that is mounted on a base block 24. This base block is provided with a reduced portion 25 that is externally threaded to engage internal threads formed in the hub of a bevel gear 26 which is rotatably mounted in a plate 27 secured to the base 3 of the machine frame. A pinion 28 pinned to an inclined shaft 29, which also is rotatably mounted in the base 3, meshes with the bevel gear 26 and carries a crank or handle 30 by means of which it is rotated.

Figure 4:
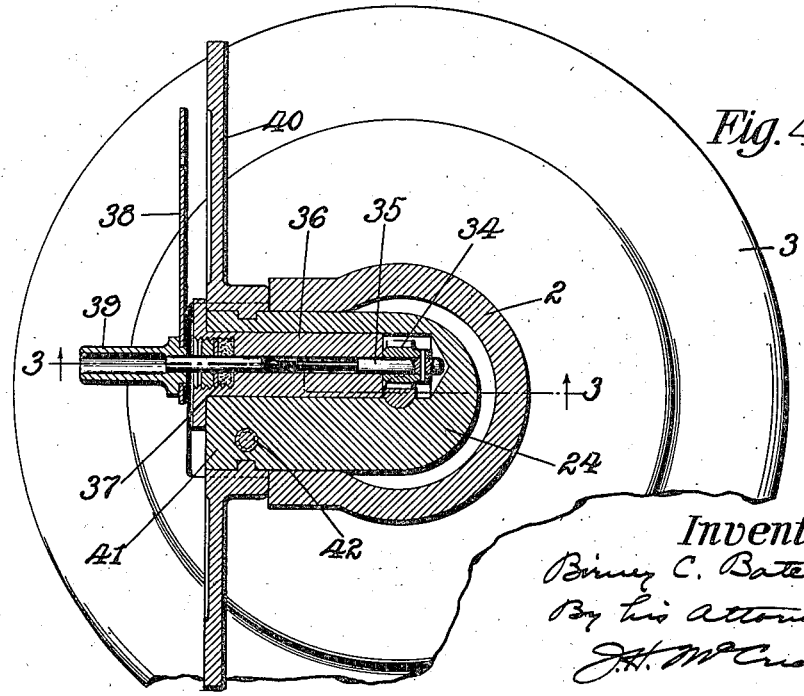
Fig. 4 is a cross sectional view on the line 4—4, Fig. 3.

For the purpose of indicating the force required to rupture the test specimen, a rod 32 having rack teeth formed on its lower portion, is mounted in a hole 33 drilled centrally in the spring base 24, and this rack meshes with a pinion 34 pinned to a small shaft 35, Fig. 4, that is rotatably mounted in a bushing 36 supported in the spring base member 24. This shaft projects through a stuffing box 37 which exerts a very slight friction on the rotative movement of the shaft, and a pointer 38 and a knurled head 39 are secured to the forward end of this shaft. The pointer swings over a graduated dial plate 40 that straddles the forward end of the projection 41 of the member 24 and it is secured to this projection by a screw 42, Fig. 4.

Figure 2:
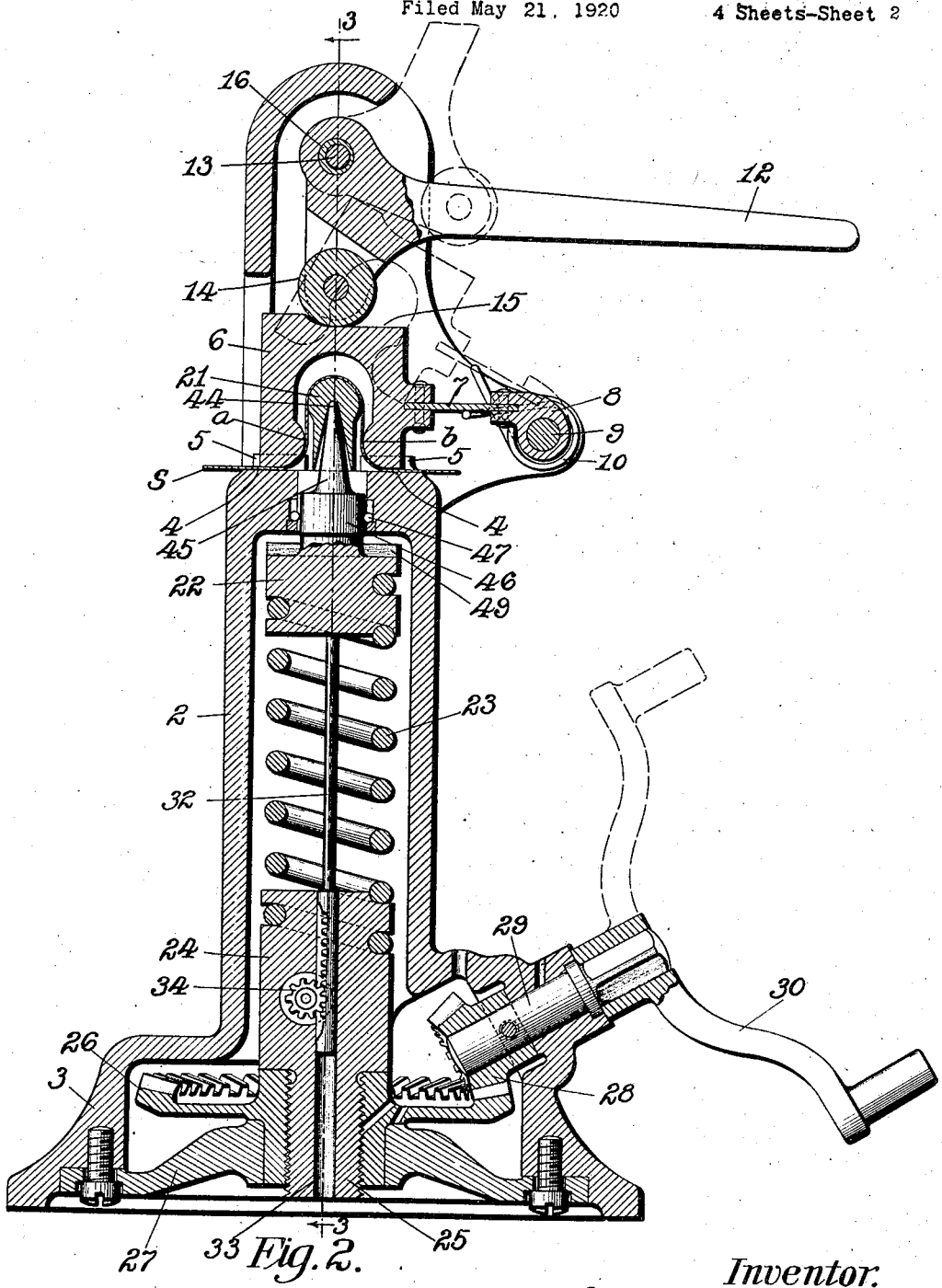
Fig. 2 is a vertical cross sectional view of the machine shown in Fig. 1.

It will be seen from an inspection of Fig. 2 that the U-shaped clamping head 6 is provided with two rounded lip portions $a$ and $b$, respectively, adjacent to the plunger head 21, and that these lips are separated by a distance substantially equal to, or preferably slightly more, than the diameter of the cylindrical surface of the plunger head.

The average thickness of the strip of paper equalizes the difference between these two dimensions so that the vertical portions of the loop of the strip S which are subjected to the rupturing strain are substantially parallel.

One of the objections to prior constructions has been that the clamping jaws crush the fibre of the paper and thus weaken it, causing it to rupture at the point at which it is clamped, and failing to give a correct measurement of the tensile strength of the paper. In the construction shown the rounded surfaces $a$ and $b$ exert a friction on the strip S between the points at which it is clamped and the straight legs of the loop. The rounded head of the plunger also exerts a frictional action on the strip. The stress on the paper therefore is greatest on the two vertical portions of the loop which are free from contact either with the parts 6 or 21. That is, the frictional contact of the strip with the cylindrical surfaces of the plunger head and with the lips $a$ and $b$, diminishes the stress in the portions of the paper in engagement with these parts. Consequently, if the paper is uniform in structure it will break where the stress in it is greatest, namely, in one of the free vertical sections of the loop.

In order to ensure an equalization of the pressure over the width of the strip S, the plunger head 21 is mounted on a ball point 44 the center of which lies substantially in the axis of the cylindrical surface of the plunger 21. This point 44 is formed at the upper end of a conical projection 45 that extends upwardly from the plunger 22, and it enters a larger conical recess formed in the lower part of the plunger head 21 so that the head may have a limited rocking movement in any direction about the point 44. This construction prevents the unequal distribution of the strain on the strip which otherwise might be produced by improperly placing it in the machine.

For the purpose of preventing accidental removal of the plunger head 21 from the ball point 44, the head is drilled at its opposite sides, as best shown in Fig. 3, to receive a flexible member 43 such as cord, catgut or the like, which also passes through a hole in the base of the conical projection 45. An upright cylindrical projection 46 from the plunger 22 engages a ball bearing 47 which guides it laterally and prevents any appreciable friction as the plunger rises.

It will now be understood that in using the machine the strip of paper to be tested is looped over the plunger head 21, the clamping head 6 being raised at this time, and the ends are placed between the positioning lugs 5—5 and held there loosely while the lever 12 is swung downwardly thus bringing the head 6 into its clamping position. The specimen now being firmly clamped in the machine, the handle 30 is next rotated to raise the spring base 24, this action being produced by the threaded engagement of the parts 24 and 26. Any rotative movement of the spring base 24 is prevented by the engagement of the projection 41 with the walls of the slot in the frame 2 through which this projection extends. The pointer 38 at this time should be on zero, and so long as the members 24 and 22 at opposite ends of the spring move in unison, no movement of the pointer will be produced. As soon, however, as the test strip S begins to resist the upward movement of the plunger head 21, the spring base 24 will be raised relatively to the plunger 22, and since the upper end of the rod 32 bears against the part 22 this rod will be forced downwardly in the hole 33 thus producing a movement of the pointer 38 over the scale 40. The operations above described are continued until the paper is ruptured when the spring 23 will force the member 22 up quickly to the upper limit of its stroke, this motion, however, being checked by the cushion 49 thus moving the part 22 away from the upper end of the rod 32. The pointer 38 remains in the position to which it has been moved thus retaining the reading until it is re-set by turning the knurled head 39. After the test has been completed the lever 12 may be swung upwardly to release the clamping head 6 and the handle 30 may then be turned to lower the spring base 24 into the position shown in Fig. 2.

It will now be seen that the invention provides a very neat substantial instrument convenient to use and which will give very accurate results. The dial 40 can be accurately calibrated by hanging weights of known mass on the plunger head 21. Since the upward movement of the plunger is resisted by two thicknesses of the test strip, the dial obviously will be calibrated to indicate one-half the pressure exerted by the spring 23. Due to the substantial elimination of friction to the movements of the parts moved by the spring 23 the results given are very accurate. The friction on the pointer spindle 35 is very slight and only enough to prevent its accidental movement while it retains a reading or indication.

It obviously is desirable for the purpose of obtaining accurate results to have the test strips of uniform width and for this purpose the machine is equipped with a pair of rotary shears. These shears comprise two rolls 50 and 51, Figs. 1 and 2, mounted respectively on studs 52 and 53, these rolls having cooperating shearing edges which cut a strip of definite width from a sheet of paper run between them. It is obvious that the strip can be cut in any direction with reference to the grain or fibre of the paper and consequently the testing operation can be performed with regard to a known direction of this fibre or grain. This is a distinct advantage in any machine for testing sheet materials, particularly in testing paper, since nearly all papers have a very definite direction of grain.

Figure 5:
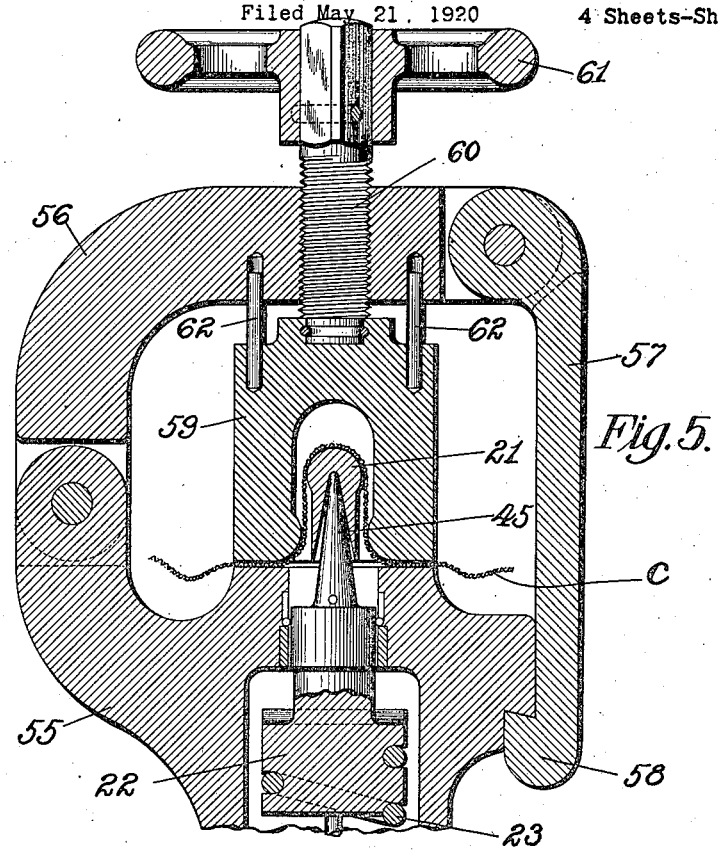
Fig. 5 is a vertical cross sectional view of the upper part of the machine showing it equipped with the clamping mechanism designed especially for use in testing fabrics.

Fig. 5 shows a modified construction adapted especially for testing cloth, fabrics and other sheet materials that must be clamped more firmly than paper. In this construction the frame 55 is like the frame previously described except at its upper portion where it is provided at one side with a lug to which is pivoted a bracket 56 carrying a pivoted arm 57 provided with a hooked end 58 to engage a notch formed in the opposite side of the frame. In this construction the test specimen C is clamped in position by a clamping head 59 substantially like the head 6, but this head is loosely mounted on the lower end of a clamping screw 60 which is threaded through the bracket 56 and is provided above said bracket with a hand wheel 61. Two pins 62—62 projecting upwardly from the head 59 into holes drilled in the lower face of the bracket 56 prevent the head from rotating while guiding it vertically.

Fig. 5 shows a specimen clamped in testing position. The testing operation and the indication of the rupturing strain is exactly like that above described, the only difference being in the procedure of clamping and releasing the goods. Prior to clamping the cloth the bracket 56 and arm 57 are swung backwardly to the left from the position in which these parts appear in Fig. 5, and after the fabric has been placed over the plunger head 21 these parts are then swung in a clockwise direction and the arm 57 rests against the right-hand face of the frame 55 due to gravity. The handle 61 is then turned to force the clamping head 59 firmly down on to the cloth and this movement raises the hook 58 into engagement with the notch in the frame 5 so that any further upward movement of the bracket 56 is prevented. Consequently, the further rotation of the screw 60 forces the clamping head 59 down very firmly on to the cloth and clamps it securely in its testing position. The releasing movement of the cloth after the testing operation has been completed is obvious from the foregoing description. In this connection it may be stated that in testing cloth it is not usual to use a strip of fabric of definite width but to place the fabric in the machine or instrument and apply the test at any desired point in the goods. This usually is referred to as a "grab" test.

While I have herein shown and described the best embodiment of the invention of which I am at present aware, it will be understood that this embodiment may be modified in many details without departing from the spirit or scope of this invention. For instance, the plunger head 21 has been shown and described as having a cylindrical surface but it will be evident that this surface might for many purposes be of some other form than that of a true cylinder. That is, the surface might be elliptical in cross section. I prefer, however, to use a cylindrical surface.

What is claimed as new is:

1. In a machine for testing the strength of sheet material, the combination of parts for holding a strip of material to be tested in the form of a loop, said strip being of substantial width, mechanism for relatively moving said parts to tension said loop, said parts being constructed to exert a substantially uniform tension across the entire width of said strip, and means for indicating the intensity of the force applied to said strip.

2. In a machine for testing the strength of sheet material, the combination of parts for holding a strip of material to be tested in the form of a loop, said strip being of substantial width, mechanism for relatively moving said parts to tension said loop, said parts being constructed to exert a substantially uniform tension across the entire width of said strip, a spring through which said relative movement is transmitted, and an indicator arranged to be operated by the distortion of said spring.

3. In a machine for testing the strength of sheet material, the combination of a plunger head to engage a strip of material to be tested, and supporting means for said plunger head enabling it to rock transversely of said strip to equalize the strain on said strip.

4. In a machine for testing the strength of sheet material, the combination of means for clamping the specimen to be tested at spaced points, a plunger head for engaging the specimen between said points to apply tension thereto, means for relatively moving said clamping means and plunger head to rupture said specimen, and supporting means for one of said specimen engaging parts enabling it to rock to equalize the tension on the specimen.

5. In a machine for testing the strength of sheet material, the combination of means for clamping the specimen to be tested at spaced points, a plunger head for engaging the specimen between said points, and supporting means for said head enabling it to rock freely to equalize the strain on said specimen.

6. In a machine for testing the strength of sheet material, the combination of means for clamping the specimen to be tested at spaced points, a plunger head for engaging the specimen between said points, said plunger head having a cylindrical surface for engagement with said specimen, means including a spring for moving said head to tension the specimen, and supporting means for said head enabling it to rock relatively to the spring to equalize the tension on the specimen.

7. In a machine for testing the strength of sheet material, means for clamping a test strip of said material at spaced points, a plunger head having a curved surface to engage said strip between said points, and means for relatively moving said plunger and clamping means to tension the strip, the elements of said surface which engage the strip being straight lines.

8. In a machine for testing the strength of sheet material, means for holding a test strip of said material, a plunger head having a cylindrical surface to engage said strip, and means supporting said plunger head substantially at the axis of said cylindrical surface and permitting said head to rock about its point of support.

9. In a machine for testing the strength of sheet material, means for holding a test strip of said material, a plunger head having a cylindrical surface to engage said strip, and a ball point supporting said plunger head substantially at the axis of said cylindrical surface whereby said head is enabled to rock freely on said point.

10. In a machine for testing the strength of sheet material, the combination of a part having a face to receive the test specimen, a clamping head to hold said specimen against said face, and a hand lever arranged to act on said head to force it into its specimen clamping position, said lever and head being arranged to automatically lock the lever in the latter position.

11. In a machine for testing the strength of sheet material, the combination of a part having a face to receive the test specimen, a clamping head to hold said specimen against said face, and a hand lever arranged to act on said head to force it into its specimen clamping position, the line of thrust of said head on the lever being substantially in a line connecting the fulcrum of said lever with the point at which it applies pressure to said head.

12. In a machine for testing the strength of sheet material, the combination of a part having a face to receive the test specimen, a clamping head to hold said specimen against said face, a hand lever arranged to act on said head to force it into its specimen clamping position, and means whereby the pressure exerted on said head by said lever may be adjusted.

13. In a machine for testing the strength of sheet material, the combination of a part having a face to receive the test specimen, a clamping head to hold said specimen against said face, a hand lever for forcing said head into its specimen clamping position, and an eccentric bushing in which said lever is fulcrumed, said bushing being adjustable about said fulcrum.

14. In a machine for testing the strength of sheet material, the combination of a part having a face to receive the test specimen, a clamping head to hold said specimen against said face, a pivoted arm supporting said head, a spring acting on said arm to hold the head normally away from said face, and means for moving the head against the action of said spring.

15. In a machine for testing the strength of sheet material, the combination of a part having a face to receive a test strip, an inverted U-shaped head for clamping said strip against said face at spaced points, a plunger head movable into the space between opposite sides of said U-shaped head to tension said strip, said plunger head having a curved surface to engage substantially the entire width of the portion of said strip held between said points, and means for relatively moving said plunger and said U-shaped head to tension the strip.

16. In a machine for testing the strength of sheet material, the combination of a part having a face to receive a test specimen, an inverted U-shaped head for clamping the specimen against said face, a plunger head movable into the space between opposite sides of said U-shaped head to tension the specimen, said plunger head having a cylindrical surface to engage the specimen, and said U-shaped head having rounded lips adjacent to said plunger, the distance between said lips being somewhat greater than the diameter of the cylindrical surface of the plunger head.

17. In a machine for testing the strength of sheet material, the combination of means for clamping a test strip of said material at points spaced apart leaving an intermediate length of said strip free, a plunger head having a curved surface to engage said strip between said points, the elements of said surface engaging the strip being straight lines, means for relatively moving said plunger head and clamping means to tension the strip, and supporting means for said plunger head enabling it to rock freely transversely of said strip to equalize the strain on said strip.

18. In a machine for testing the strength of sheet material, the combination of a hollow upright frame, an upright helical spring mounted in said frame, a base for said spring, manually operated means for raising said base, a plunger mounted on the upper end of said spring, means for clamping a specimen in position for engagement by said plunger, an anti-friction bearing guiding said plunger laterally and an indicator operated by the compression of said spring.

19. In a machine for testing the strength of sheet material, the combination of a hollow upright frame, an upright helical spring mounted in said frame, a base for said spring, manually operated means for raising said base, a plunger mounted on the upper end of said spring, means for clamping a specimen in position for engagement by said plunger, and an indicator carried by said base and comprising a pinion, a rack engaging said pinion and an extension from said rack projecting upwardly into engagement with said plunger, whereby the indicator is operated by the compression of said spring.

20. In a machine for testing the strength of sheet material, the combination of a hollow upright frame having a base to rest upon a flat support, an upright helical spring mounted in said frame, a base for said spring having a threaded portion, manually operated means mounted in said frame base for cooperating with said threaded portion to raise and lower said spring base, a plunger mounted on the upper end of said spring, means for clamping a specimen in position for engagement by said plunger, and an indicator arranged to be operated by the compression of said spring.

21. In a machine for testing the strength of sheet material, the combination of a hollow upright frame having a base to rest upon a flat support, an upright helical spring mounted in said frame, a base for said spring having a threaded portion, a gear having a threaded portion to engage the threaded part of said spring base, said gear being mounted in the base of said frame, a pinion engaging said gear, a shaft supporting said pinion and mounted in an inclined position, a handle for rotating said shaft, a plunger mounted on the upper end of said spring, means for clamping a specimen in position for engagement by said plunger, and an indicator arranged to be operated by the compression of said spring.

22. A machine for testing the tensile strength of a strip of sheet material, having, in combination, means for holding and tensioning a strip of said material, means for indicating the intensity of the tensioning force, and a pair of shearing rolls cooperatively mounted to cut a test strip of predetermined width from a strip of sheet material.

23. In a machine for testing the strength of sheet material, the combination of a hollow upright frame having a face on its upper end to receive a test strip of said material, means for clamping the strip on said face at points spaced apart, an upright helical spring mounted in said frame, a base for said spring, mechanism for raising said base, a plunger mounted on the upper end of said spring, a plunger head carried by said plunger and arranged to engage said test strip, said plunger head being mounted to rock relatively to said plunger to equalize the strain on said strip, and an indicator arranged to be operated by the compression of said spring.

24. In a machine for testing the strength of sheet material, the combination of a hollow upright frame having a face at its upper end to receive a test strip of said material, a U-shaped head for clamping said strip against said face at points spaced apart leaving an intermediate portion of said strip free, means for moving said head into its clamping position, an upright helical spring mounted in said frame, a base for said spring, means for raising said base, a plunger mounted on the upper end of said spring, a plunger head carried by said plunger and arranged to engage substantially the entire width of said strip, means supporting said plunger head for rocking movement transversely of said strip to equalize the strain on the strip, and an indicator arranged to be operated by the compression of said spring.

In testimony whereof I have signed my name to this specification.

BIRNEY CLARK BATCHELLER.